US011715188B1

(12) United States Patent
Mody et al.

(10) Patent No.: US 11,715,188 B1
(45) Date of Patent: Aug. 1, 2023

(54) PERMANENT FAULT DETECTION FOR IMAGING AND VISION HARDWARE ACCELERATORS

(71) Applicant: TEXAS INSTRUMENTS INCORPORATED, Dallas, TX (US)

(72) Inventors: Mihir Narendra Mody, Bengaluru (IN); Veeramanikandan Raju, Bengaluru (IN); Niraj Nandan, Plano, TX (US); Samuel Paul Visalli, Allen, TX (US); Jason A. T. Jones, Richmond, TX (US); Kedar Satish Chitnis, Bengaluru (IN); Gregory Raymond Shurtz, Houston, TX (US); Prithvi Shankar Yeyyadi Anantha, Bengaluru (IN); Sriramakrishnan Govindarajan, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/682,735

(22) Filed: Feb. 28, 2022

(51) Int. Cl.
  *G05B 23/02* (2006.01)
  *G06T 1/20* (2006.01)
  *G06T 7/00* (2017.01)
  *G06T 3/40* (2006.01)
  *H04N 17/00* (2006.01)

(52) U.S. Cl.
  CPC ........ *G06T 7/0002* (2013.01); *G05B 23/0259* (2013.01); *G06T 1/20* (2013.01); *G06T 3/40* (2013.01); *G06T 7/97* (2017.01); *G06T 2207/10016* (2013.01); *H04N 17/00* (2013.01)

(58) Field of Classification Search
  None
  See application file for complete search history.

(56) References Cited

U.S. PATENT DOCUMENTS

| | | | |
|---|---|---|---|
| 7,519,494 B2 * | 4/2009 | Briere | G01R 31/318547 702/117 |
| 11,109,016 B2 * | 8/2021 | Clark, II | H04N 5/357 |
| 2004/0088638 A1 * | 5/2004 | Cheung | G06F 11/273 714/E11.17 |
| 2015/0304648 A1 * | 10/2015 | Gulati | G06T 7/0002 348/175 |

* cited by examiner

*Primary Examiner* — Matthew C Bella
*Assistant Examiner* — Rumana Khandekar
(74) *Attorney, Agent, or Firm* — Michael T. Gabrik; Frank D. Cimino (57) ABSTRACT

An electronic device may be configured to detect a fault in imaging and vision hardware accelerators. The electronic device may include a controller configured to select a first golden input frame of multiple golden input frames to perform a first self-test, and retrieve a first reference image signature corresponding to the first golden input frame. The electronic device may include a hardware accelerator module configured to obtain the first golden input frame, and generate a first output frame based on the first golden input frame. The electronic device may include a signature generator configured to generate a first generated image signature based on the first output frame. The electronic device may include a signature comparison module configured to compare the first generated image signature to the first reference image signature in order to determine whether the hardware accelerator module includes a fault at a first time.

11 Claims, 6 Drawing Sheets

PERMANENT FAULT DETECTION FOR IMAGING AND VISION HARDWARE ACCELERATORS

BACKGROUND

Electronic devices operating in modern motor vehicles can suffer faults that compromise a functional safety level of the motor vehicle. These faults may damage the motor vehicle and expose drivers and passengers to unreasonable risk levels. Electronic devices are susceptible to various types of faults. Transient faults are soft errors typically caused by cosmic radiation resulting in bit-flip. A typical mechanism to detect transient faults is by means of redundancy in hardware architecture. Permanent faults are hard errors typically caused by damage to on-board electronic devices due to heat, ageing, vibration, or the like. The typical mechanism to detect permanent faults is by means of a self-test.

SUMMARY

In general, in one aspect, embodiments disclosed herein relate to an electronic device configured to detect a fault in imaging and vision hardware accelerators. The electronic device includes a communication module configured to obtain multiple golden input frames and multiple use-case input frames via a frame sequence. The electronic device includes a controller configured to select a first golden input frame of the multiple golden input frames to perform a first self-test, and retrieve a first reference image signature corresponding to the first golden input frame. The electronic device includes a hardware accelerator module configured to obtain the first golden input frame, and generate a first output frame based on the first golden input frame. The electronic device includes a signature generator configured to generate a first generated image signature based on the first output frame. The electronic device includes a signature comparison module configured to compare the first generated image signature to the first reference image signature, and output a first comparison result in response to the comparison. The first comparison result indicates whether the first generated image signature and the first reference image signature are identical to one another. The controller determines, based on the first comparison result, whether the hardware accelerator module includes the fault at a first time.

In general, in one aspect, embodiments disclosed herein relate to a system for detecting a fault in imaging and vision hardware accelerators. The system includes a capture device configured to obtain multiple use-case input frames from an environment and introduce the multiple use-case input frames into a frame sequence. The system includes an external memory configured to introduce multiple golden input frames into the frame sequence. The system includes an electronic device. The electronic device includes a communication module configured to obtain the multiple golden input frames and the multiple use-case input frames via the frame sequence. The electronic device includes a controller configured to select a first golden input frame of the multiple golden input frames to perform a first self-test, and retrieve a first reference image signature corresponding to the first golden input frame. The electronic device includes a hardware accelerator module configured to obtain the first golden input frame, and generate a first output frame based on the first golden input frame. The electronic device includes a signature generator configured to generate a first generated image signature based on the first output frame. The electronic device includes a signature comparison module configured to compare the first generated image signature to the first reference image signature, and output a first comparison result in response to the comparison. The first comparison result indicates whether the first generated image signature and the first reference image signature are identical to one another. The controller determines, based on the first comparison result, whether the hardware accelerator module includes the fault at a first time.

In general, in one aspect, embodiments disclosed herein relate to a method for detecting a fault in imaging and vision hardware accelerators. The method includes obtaining, by a communication module, multiple golden input frames and multiple use-case input frames via a frame sequence. The method includes selecting, by a controller, a first golden input frame of the plurality of golden input frames, the first golden input frame being at a first position in time in the frame sequence. The method includes producing, by a hardware accelerator module, a first output frame upon processing of the first golden input frame. The method includes generating, by a signature generator, a first generated image signature based on the first output frame. The method includes retrieving, by the controller, a first reference image signature corresponding to the first golden input frame. The method includes comparing, by a signature comparison module, the first reference image signature to the first generated image signature. The method includes outputting, by a signature comparison module, a first comparison result in response to the comparison. The first comparison result indicates whether the first generated image signature and the first reference image signature are identical to one another. The method includes determining, by the controller and based on the first comparison result, whether the hardware accelerator module includes a fault at a first time. The controller is configured to determine that the hardware accelerator module includes the fault at the first time if the first comparison result indicates that the first generated image signature and the first reference image signature are not identical to one another. The controller is configured to determine that the hardware accelerator module does not include the fault at the first time if the first comparison result indicates that the first generated image signature and the first reference image signature are identical to one another.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

In one or more embodiments, a fault detection system is hardware or software executed on a processor configured to detect errors associated with the processor such as errors in a hardwired connection (e.g., continuity errors). The fault detection system may include an electronic device configured to provide a target functional safety level in accordance with a safety standard, such as the Automotive Safety Integrity Level (ASIL). ASIL is a risk classification scheme defined by ISO 26262, the safety standard for electronic devices in automobiles and motor vehicles. IEC 61508 is similar standard for functional safety for industrial systems. These standards define requirements to avoid unreasonable risk due to hazards caused by malfunctioning behavior of the electronic device.

In some embodiments, automotive and industrial functional safety levels are standardized as a function of risk. In these safety levels, the risk may be assessed in proportion to a severity of a safety violation and a frequency of occurrence of the violation. Further, the frequency may be assessed in proportion to an exposure level and a controllability of the exposure. In this regard, the frequency is rated based on an exposure of the user to a hazardous situation and an ability of the user to control the hazardous situation. The risk may in turn be proportional to the frequency being applied to the severity of the error that caused the hazardous situation. The values of severity, frequency, exposure, and controllability may be predefined in one or more of the standards described above.

In one or more embodiments, safety is an absence of unacceptable risks, where risk is a combination of the frequency of an occurrence of harm and the severity of that harm. Functional safety may be an absence of unreasonable risk due to hazards caused by malfunctioning behavior of an electrical/electronic vehicle system architecture (E/E) systems. In this regard, the functional safety standards described above may be defined as including various level of safety based on the severity and the controllability in all aspects of the E/E system. These functional safety standards may include automotive standards and industrial standards. In some embodiments, the automotive standards include four levels (e.g., QM, ASIL-A, ASIL-B, ASIL-C and ASIL-D) and the industrial standards include three levels (e.g., SIL1, SIL2 and SIL3).

In one or more embodiments, the fault detection system implements safety levels based on ISO 26262 and ensures that the high functional safety level is included in each built. The high functional safety level may be an ASIL-B level for electronic devices or System-on-Chips (SoCs) comprising image, vision, or video hardware accelerators. In some embodiments, the fault detection system implements safety levels based on IEC 61508 for industrial systems.

The fault detection system described herein may establish a safety management system to meet internationally recognized best practices and the latest approach to risk management. The fault detection system may detect transient and permanent faults. These self-tests may be performed periodically over predefined intervals while performing image collection. In some embodiments, the interval is a Fault Tolerant Time Interval (FTTI) between 50 milliseconds (ms) and 250 ms, inclusive. In motor vehicle applications, the FTTI may be between 100 milliseconds (ms) and 200 ms, inclusive.

While the embodiments described herein can be applied to many different types of applications, an example application is presented in which the fault detection system detects faults with respect to an electronic device in a motor vehicle that processes video frames captured by one or more cameras mounted in, or on, the motor vehicle. The camera(s) and the electronic device that processes the video frames may be part of, for example, an object collision detection capability, a self-driving capability, and the like. During operation of the motor vehicle, video frames from the cameras are captured and processed by an electronic device. Such normal operation video frames are referred to herein as "use case" frames. The electronic device processes the use-case input frames and provides a corresponding output. The output may be, for example, a use-case output frame. The electronic device can perform any suitable type of processing on the use-case input frame to produce the corresponding output frame. The electronic device that processes the use-case input frames to generate output frames also can generate a "signature" of one or more of the use-case output frames. In one example, a signature is a cyclic redundancy checksum (CRC) value of the output frame.

The electronic device can also process "golden" input frames (also referred to herein as "pre-defined" input frames). A golden input frame is a video frame for which the output golden frame from the electronic device has had its signature already computed. During a self-test, a golden input frame is processed by the electronic device to produce a golden output frame, and a signature is computed for the golden output frame. The fault detection system compares the golden output frame's newly computed signature to the signature that was precomputed and stored in memory. If the signatures match, the electronic device is deemed to be operating correctly. If the signatures do not match, the electronic device is deemed not to be operating correctly. Multiple golden frames and their corresponding signatures may be pre-stored in memory in the motor vehicle (e.g., stored therein at the factory or dealer).

In one embodiment, the electronic device may process the use-case or golden input frames to produce corresponding output frames and signatures of such output frames. In another embodiment, the use-case and golden input frames may be downsampled (e.g., by the electronic device) and the downsampled frame is used by the electronic device to generate an output frame.

In one or more embodiments, during normal operation, the fault detection system performs the self-test on the electronic device. The electronic device may receive a triggering signal (e.g., an interrupt signal or command) to perform the self-test. The triggering signal may be generated periodically at a frequency of the FTTI. During the self-test, the electronic device receives a golden input frame from memory, processes the golden input frame (full frame or a downsampled version) to generate a golden output frame, and generates a signature for the golden output frame. As noted above, the signature computed for the golden output frame by the electronic device is compared to the signature pre-stored in memory. If the two signatures match, the electronic device is deemed to be operating properly. If the signatures do not match, the electronic device is deemed to have a failure. Multiple golden input frames and associated signatures may be stored in the motor vehicle and processed by the electronic device. As it will be explained below, if the electronic device passes a predetermined number of self-tests using multiple golden input frames, then a use-case input frame may be selected for future use as a new golden input frame. The use-case input frame selected to be a new golden frame is a use-case input frame that is acquired by the capture device between golden frames that have passed the self-test. For example, a first golden input frame is processed by the electronic device and the resulting signature computed by the electronic device matches the pre-stored signature for that particular golden frame. Then, a use-case input frame is processed by the electronic device, followed by a second golden input frame being processed by the electronic device. If the second golden input frame's signature also matches the pre-stored signature, then the electronic device is deemed to be operating correctly at and between the processing of the two golden input frames. The electronic device thus is deemed to be operating correctly when the use-case input frame was acquired between the tests performed using the first and second golden input frames. Because the electronic device is deemed to be operating correctly when it processed the use-case input frame into an output frame, the resulting output frame is deemed to be a valid representation of the use-case input frame. Thus, this particular use-case input frame can be saved and used, along with its signature, as a new golden frame. The recently obtained use-case input frame that is now designated to be a new golden frame is referred to herein as an "adaptive" golden frame in that it was acquired during operation of the motor vehicle. Accordingly, two types of golden input frames are described herein. A fixed golden input frame is a golden input frame for which a signature has been computed by systems external to the motor vehicle, and stored in the motor vehicle's memory. An adaptive golden input frame is a use-case input frame acquired during run-time of the motor vehicle and, as described herein, promoted to "golden" status, stored in memory, and subsequently used during self-tests performed by the fault detection system.

In some embodiments, fixed golden input frames and signatures may be loaded on a memory device in the motor vehicle in a monitored environment. The monitored environment may be a factory in which the motor vehicle is assembled, an automobile dealer in which the car is brought in for servicing and maintenance, or the like. The fixed golden input frames and signatures may be generated and stored in the motor vehicle in the same monitored environment. For example, a motor vehicle that is brought in to an automobile dealer to be serviced may have an external memory replaced. If the external memory contained any fixed golden input frames and signatures, new fixed golden input frames and signatures may be loaded into the replacement external memory at the automobile dealer. The automobile dealer may obtain the new fixed golden input frames and signatures from a repository storing fixed golden input frames and signatures for a specific model of the motor vehicle.

Figure 1:
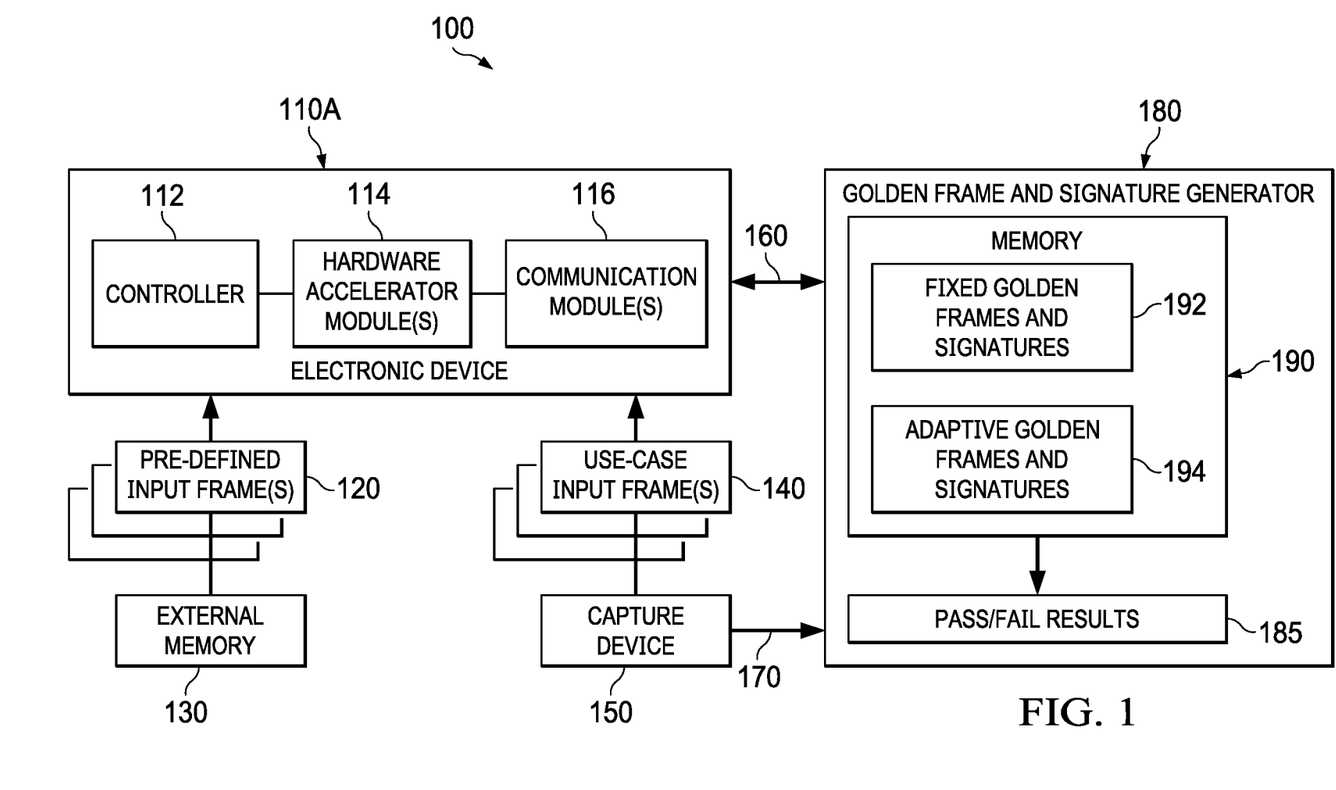
FIG. 1 is a block diagram illustrating a fault detection system including a first electronic device, in accordance with one or more embodiments.

FIG. 1 is a block diagram of a fault detection system 100 in accordance with one or more embodiments. The fault detection system 100 may be a discrete hardware circuit or a processor (e.g., a microcontroller) that executes software configured to detect faults in a hardwired connection. The faults may be continuity errors in the hardwired connection where a transmission is not completed because the hardwired connection is obstructed or broken. In the example of FIG. 1, the fault detection system 100 comprises an electronic device 110A, an external memory 130 (external to the electronic device 110A), a capture device 150, and a golden frame and signature generator 180.

In FIG. 1, the fault detection system 100 performs a plurality of safety tests periodically to detect faults in the electronic device 110A. The electronic device 110A being tested by the fault detection system 100 is shown as part of the fault detection system in FIG. 1, but may be separate from and coupled to the fault detection system 100. The fault detection system 100 detects permanent faults and hard errors that may cause unacceptable damage to internal mechanisms of electronic devices. In embodiments of motor vehicles, the fault detection system 100 detects transient faults and permanent faults as they occur and prevents errors from compromising a functional safety level of the motor vehicle.

In the example of FIG. 1, the fault detection system 100 may be configured to process image-based data (e.g., video frames). In some embodiments, the fault detection system 100 obtains at least one input frame, processes the input frame in a self-test (e.g., a self-generated safety test), and generates at least one output frame as a result. In the self-test, the input frame is used to determine whether the electronic device 110A is functioning properly by processing the input frame to produce an output frame and comparing aspects (e.g., signatures) of the output frame against expected values.

In one or more embodiments, to determine whether the electronic device 110A is functioning properly, the capture device 150 may provide at least one use-case input frame 140 into a frame sequence for the electronic device 110A and for the golden frame and signature generator 180. The capture device 150 is configured to collect images of an environment. For example, the capture device 150 may be a sensor, a stereoscopic camera pair, or a video camera configured to generate images as an output. The use-case input frame 140 may be any frame captured by the capture device 150 at any point in time.

In one or more embodiments, the external memory 130 may provide one or more pre-defined input frames 120 to the electronic device 110A. These pre-defined input frames 120 may be full frames or downsampled versions of full frames. The pre-defined input frames 120 may be a combination of golden input frames previously stored (as explained above) in memory by the factory or automobile dealer and adaptive golden frames (e.g., use-case input frames that have been determined to be new golden frames after being processed by the electronic device 110A). From the factory, the external memory may only have fixed golden frame and not yet have any adaptive golden frames, but adaptive golden frames may be added to the memory as explained below as the motor vehicle is operated. The pre-defined input frames 120 may be transmitted from the external memory 130 to the electronic device 110A periodically consistent with, for example, one of the aforementioned standards, such as a Fault Tolerant Time Interval (FTTI). In one specific example, the pre-defined input frames are provided to the electronic device 110A at a rate of one frame every 100 ms. In some embodiments, the pre-defined input frames are provided to the electronic device on demand (as initiated by the electronic device).

The electronic device 110A is hardware or software executed on the processor and configured to perform the self-test and includes a controller 112, at least one hardware accelerator module 114, and at least one communication module 116. At the electronic device 110A, the use-case input frame 140 and the pre-defined input frames 120 are received by the communication module 116. Once the use-case input frame 140 and the pre-defined input frames 120 are received at the electronic device 110A, the controller 112 may trigger the hardware accelerator module 114 to process these frames to generate a corresponding output (e.g., output frame). The controller 112 may use these outputs to start the self-test by generating signatures based on each output. These signatures may be derived faster by first downconverting the resolution of the frames collected, thereby permitting more per unit time to be processed as described herein. Once these signatures are generated, the electronic device 110A may be configured to obtain reference image signatures from the golden frame and signature generator 180 to compare against the signatures just generated by the controller 112. The signatures generated on the fly by the electronic device 110A and the reference image signatures obtained from the golden frame and signature generator 180 are compared by the golden frame and signature generator 180 to generate multiple comparison results. If the comparison results indicate that the generated image signatures and the obtained reference image signatures are not identical, the comparison results may be used to identify errors in the image processing capabilities of the hardware accelerator module 114. If the comparison results do not indicate that the reference image signatures and the obtained signatures are identical, the hardware accelerator module 114 may be deemed to be operating correctly.

In some embodiments, the electronic device 110A obtains pre-defined input frames 120 from the external memory as well as use-case input frame 140 from the capture device 150. As use-case input frames 140 are generated by the capture device 150 and provided to the electronic device 110A, the use-case input frames 140 are also provided (through a transmission 170) to the golden frame and signature generator 180. In one or more embodiments, the use-case input frames 140 and the pre-defined input frames are obtained and combined by the communication module 116 of the electronic device 110A into a frame sequence. The frame sequence is described in more detail in reference to FIG. 4.

In the example of FIG. 1, the golden frame and signature generator 180 is hardware (e.g., a combination of logic gates, flip-flops, and the like) or software executed on the processor and configured to compare generated image signatures and reference image signatures. As shown in FIG. 1, the controller 112 and the golden frame and signature generator 180 are two separate modules or devices in the fault detection system 100. In this case, the controller 112 monitors and controls the operation of the hardware accelerator module 114 and the communication module 116. In some embodiments, the controller 112 is configured to separate and distribute communication transmissions including the frame sequence. For example, the controller 112 may cause the communication module 116 to forward the frame sequence to the golden frame and signature generator 180 in transmission 160.

In some embodiments, the hardware accelerator module 114 is configured to perform one or more specialized processing activities. The hardware accelerator modules 114 may include at least one module dedicated to image and vision processing (e.g., for collision detection, self-driving, and the like). At least one hardware accelerator module 114 may generate a use-case output frame based on each use-case input frame received by the accelerator module. These output frames may include processing associated with, for example, weather tracking systems or ambience light control systems that rely on input frames to double-check dashboard data in a motor vehicle. The controller 112 may be configured to perform the self-test to determine that permanent faults have occurred in the hardware accelerator module 114.

In some embodiments, the communication module 116 receives and transmits all communications inbound and outbound for the electronic device 110A. In some embodiments, the communication module 116 obtains at least one use-case input frame 140 from the frame sequence each time a self-test is being performed, and routes such use-case input frames to the hardware accelerator module 114 and the controller 112. The hardware accelerator module 114 processes the input frames to generate output frames. The controller 112 generates signatures corresponding to the output frames. The generated image signatures are then provided by the controller 112 to the communication module 116. The communication module 116 may forward the generated image signatures to the golden frame and signature generator 180 for comparison.

In the example of FIG. 1, the golden frame and signature generator 180 generates a comparison result after comparing two or more image signatures. During a self-test, the golden frame and signature generator 180 compares a signature generated by the controller 112 to a reference image signature previously stored in memory 190. The golden frame and signature generator 180 may provide the comparison results to the controller 112. The controller 112 may determine whether a permanent fault has occurred within the hardware accelerator module 114. A potential fault has occurred if the comparison result includes information indicating that the generated image signature and the reference image signature are not identical.

As described above, if multiple comparison results show a successful operation of the hardware accelerator module 114, a use-case output frame and its corresponding generated image signatures may be provided to the golden frame and signature generator 180 to save as a new pre-defined, adaptive input frame.

In the golden frame and signature generator 180, a memory 190 may be used as a repository to store fixed golden frames and signatures 192 and adaptive golden frames and signatures 194. In some embodiments, the memory 190 is an extension of the external memory 130 or a copy of the same. The memory 190 may also be a local memory. The fixed golden frames and signatures 192 may include pre-defined image frames and signatures that are previously determined to have a predictable result when processed through the hardware accelerator module 114. The fixed golden frames and signatures 192 may include frames and signatures generated while the system is offline and using identical settings of use-cases at a reduced resolution. The adaptive golden frames and signatures 194 may include continuously generated image signatures from output frames of processed use-case input frames 140.

In the golden frame and signature generator 180, the outputs of the processed input frames may be validated against an integrity checker profile. The integrity tester profile may be a predetermined configuration of the golden frame and signature generator 180 that determines a number of output frames from pre-defined input frames 120 needed to perform the aforementioned self-tests to detect faults in the hardware accelerator module 114. The golden frame and signature generator 180 receives the corresponding generated image signatures from the output frames and compares these generated image signatures to corresponding fixed golden signatures to generate a frame comparison result. Once the golden frame and signature generator 180 performs a number of comparison results in accordance with the integrity tester profile, the golden frame and signature generator 180 generates an output for the controller 112 to identify any differences in the comparison results in the manner described above.

In one or more embodiments, the golden frame and signature generator 180 receives a decision from the controller 112 indicating a pass/fail result 185 for one or more comparison results. If the pass/fail result 185 is a "pass", then another iteration of the self-test is performed by the fault detection system 100. If the pass/fail result 185 is a "fail", then another iteration of the self-test is not performed and the fault detection system 100 generates an instruction to fix a fault. In the case of permanent faults, the instruction to fix a fault may be providing a visual indication on a display within the vehicle that a problem has occurred with a component of the vehicle and that servicing is required. In some embodiments, the instruction may be an error in the vehicle and subsequently recoverable by a service technician that indicates that the permanent fault is located in the one of the hardware accelerator modules 114.

In one or more embodiments, the pre-defined input frames 120 may be received periodically over a predefined time duration (e.g., the duration of the FTTI). A pre-set number of pre-defined input frames 120 may be run by the electronic device 110A over the FTTI. In some embodiments, the electronic device 110A receives and downsamples these frames to perform the self-tests at ultra-fast speeds.

The number of self-tests performed during the FTTI may vary based on configuration tests requirements established in a pre-programmed memory or a dynamically changing memory buffer. The dynamic nature of the self-tests allows for the electronic device 110A to achieve a specific coverage safety goal (e.g., ASIL-B).

In one or more embodiments, the electronic device 110A covers the ASIL-B safety goal without resetting the electronic device 110A before running any input frames. In some embodiments, the electronic device 110A does not perform any context switching before running any self-tests. The electronic device 110A may be a System-on-Chip (SoC) or an Integrated Circuit (IC) configured to run input frames in multiple parts, which reduces peak loading in the electronic device 110A by creating its own input tests. The electronic device 110A is configured to perform various self-tests while providing a minimum load to the electronic device 110A.

Figure 2:
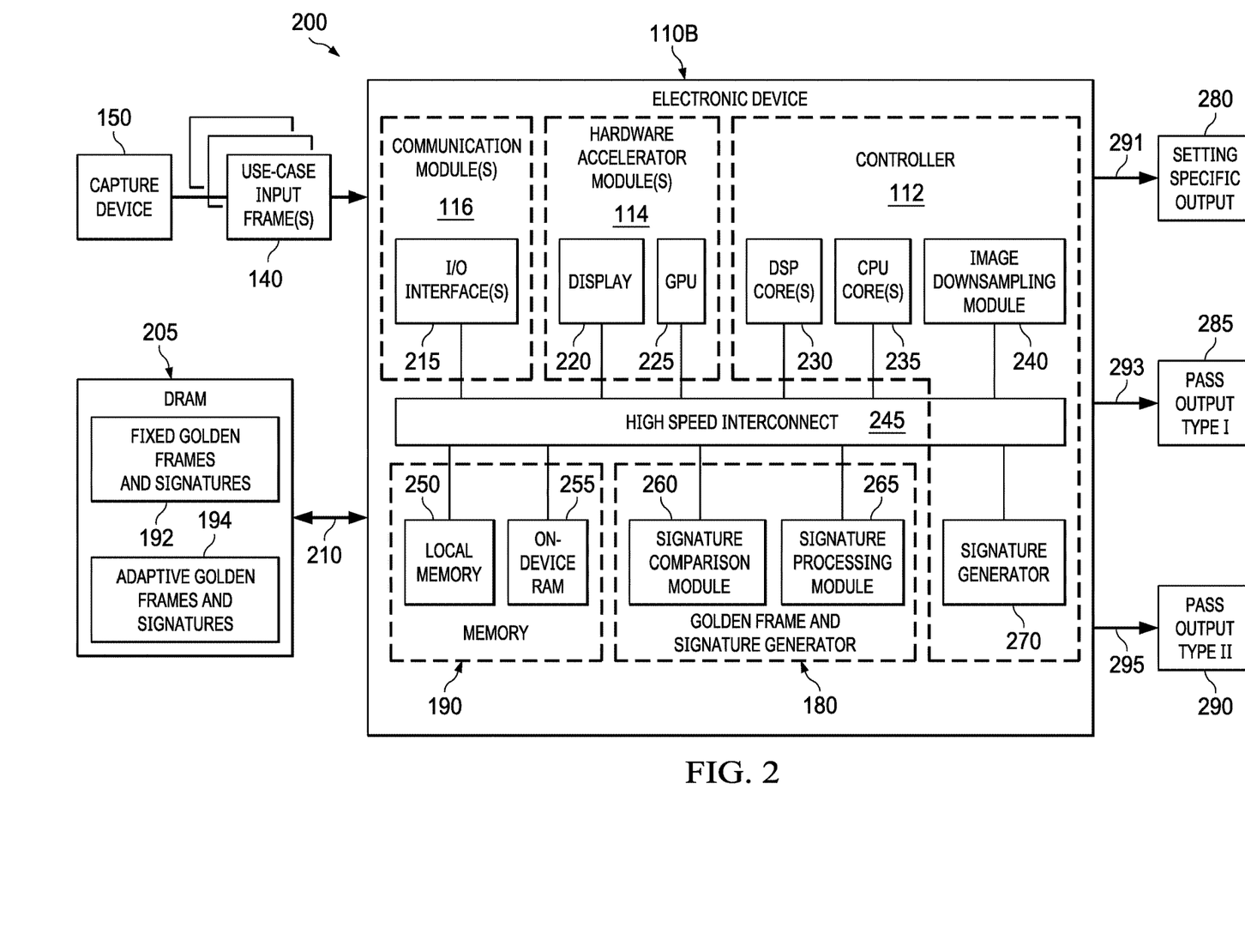
FIG. 2 is a block diagram illustrating a fault detection system including a second electronic device, in accordance with one or more embodiments.

FIG. 2 is a block diagram of a fault detection system 200 in accordance with one or more embodiments. In this example, the fault detection system 200 is a more detailed version of the fault detection system 100 of FIG. 1. The fault detection system 200 includes a dynamic random access memory (DRAM) 205 (e.g., a low-power double data rate (LPDDR4) memory) in addition to the capture device 150 and an electronic device 1106. In FIG. 2, the electronic device 1106 includes multiple electronic elements and modules that perform individual functions described in reference to the controller 112, the hardware accelerator module 114, the communication module 116, the memory 190, and the golden frame and signature generator described in reference to FIG. 1.

In FIG. 2, the electronic device 1106 may include multiple devices connected through a high speed interconnect 245. These devices may include input/output (I/O) interfaces 215, a display 220, a graphics processing unit (GPU) 225, at least one digital signal processor (DSP) core 230, at least one central processing unit (CPU) core 235, an image downsampling module 240, a local memory 250, an on-device RAM 255, a signature comparison module 260, an signature processing module 265, and a signature generator 270.

The I/O interfaces 215 may perform one or more functions associated with the communication module 116. In one or more embodiments, the I/O interfaces 215 include circuitry and ports configured to process input and output signals of the electronic device 1106.

The display 220 and the GPU 225 may perform one or more functions associated with the hardware accelerator module 114. The display 220 may be an image display device with at least one display panel (e.g., LCD panel) capable of visually displaying an image. The GPU 255 may be a specialized processor configured to accelerate graphics rendering.

The DSP cores 230, the CPU cores 235, the image downsampling module 240, and the signature generator 270 may perform one or more functions associated with the controller 112. In some embodiments, the image downsampling module 240 is hardware configured to (upon executing software) lower the size and resolution of a user-case input frame 140 and at least one pre-defined input frame 120 obtained for performing self-tests. Once the frames are collected and downsampled by the image downsampling module 240, signatures of these low resolution input frames are used to perform the self-test. The low resolution input frames may be divided into low resolution versions of the use-case input frames 140 and the pre-defined input frames 120. In the example of FIG. 2, the signatures of the input frames may be monitored by way of their corresponding height and width. In some embodiments, the signature generator 270 is hardware or software executed on the processor and configured to generate signatures of any output frame generated by the electronic device 1108. These signatures may be cyclic redundancy checksum (CRC) signatures, MISER-based signatures, HASH-based signatures, and the like.

The local memory 250 and the on-device RAM 255 may perform one or more functions associated with the memory 190. The local memory 250 may be a read-only or variable memory in the electronic device 1108. The local memory 250 may include firmware and system information of the electronic device 1108. The on-device RAM 255 may be a variable memory that is updated as operations in the electronic device 1108 change over time.

The signature comparison module 260 and the signature processing module 265 may perform one or more functions associated with the golden frame and signature generator 180. The signature comparison module 260 may be hardware (e.g., a combination of logic gates, flip-flops, registers, and the like) configured to compare generated image signatures (generated from output frames of processed golden input frames) to reference image signatures (signatures of a processed golden input frame). The signature processing module 265 may be hardware (e.g., a combination of logic gates, flip-flops, registers, and the like) configured to (upon executing software) generate a comparison result from each of the aforementioned comparisons. The comparison results may indicate whether the compared signatures are identical to one another.

In some embodiments, the electronic device 1106 generates a setting specific output 280, a pass output type I 285, and a pass output type II 290. The setting specific output 280 may be any output frame generated by the hardware accelerator modules 114 during normal operations of the electronic device 1106. The setting specific output 280 may be an internal or external signal (e.g., external signal 291) to the electronic device 1106 that includes output frames for specific operations of the motor vehicle (e.g., output frames to be used in self-driving applications). The pass output type I 285 and the pass output type II 290 may be outputs conveying similar information to the pass/fail results 185 described in reference to FIG. 1. The pass output type I 285 may be an internal or external signal (e.g., external signal 293) to the electronic device 110B that includes a "pass" or "fail" status of an output frame comparison result representative of a comparison between generated image signatures and reference image signatures. The pass output type II 290 may be an internal or external signal (e.g., external signal 295) to the electronic device 110B that includes a new golden frame and signature to be used as an adaptive golden frame and signature in subsequent self-tests.

In one or more embodiments, the fault detection system 200 includes multiple separate processing units configured to identify a golden reference frame. The fault detection system 200 may perform a first self-test once the system is powered on and may perform subsequent tests during each FTTI. Because of its adaptive processing behavior, the fault detection system 200 is not be required to reset before performing any additional self-tests after a first FTTI has lapsed. The fault detection system 200 may process downsampled versions of the use-case input frames 140 and the pre-defined input frames 120 to speed-up testing. A size of the lower resolution frames may be determined based on a processing bandwidth available in the fault detection system 200 or user input.

In the example of FIG. 2, a self-test may start when the capture device 150 and the DRAM 205 respectively provide use-case input frames 140 and pre-defined input frames (through connection 210) to the electronic device 110B. The I/O interfaces 215 may receive the use-case input frames 140 and pre-defined input frames in a frame sequence (to be discussed in detail in the description with respect to FIG. 4). The I/O interfaces 215 may forward a first pre-defined input frame to the hardware accelerator modules 114 via the high-speed interconnect 245. At the hardware accelerator modules, the first pre-defined input frame is processed as part of the normal operations of the electronic device 110B and an output frame is generated as a result. At this point, the high-speed interconnect 245 is used to deliver the output frame to the signature generator 270. The signature generator 270 generates a signature from the output frame. This generated image signature is then forwarded to the signature comparison module 260.

The controller 112 is made aware that an output frame from a pre-defined input frame was generated. In response. The controller requests or otherwise causes the DRAM 205 to provide a reference image signature that is specific to the first pre-defined input frame processed. The reference image signature is routed to the signature comparison module 260.

At the image comparison module 260, the generated image signature and the reference image signature are compared, and a result of the comparison is shared with the signature processing module. In turn, the signature processing module determines whether the signatures are identical to one another. At this point, the signature processing module 265 generates the pass out type I 285 as an signal indicating a "pass" or "fail" of the comparison result. As described above, a "pass" causes the controller 112 to start another iteration of the self-test. In contrast, a "fail" causes the controller 112 to prevent additional iterations of the self-test.

Upon generating a first "pass", the I/O interfaces 215 may forward one of the use-case input frames 140 to the hardware accelerator modules 114 via the high-speed interconnect 245. At the hardware accelerator modules, the use-case input frame 140 is processed as part of the normal operations of the electronic device 110B and a new output frame is generated as a result. At this point, the high-speed interconnect 245 is used to deliver the output frame to the signature generator 270. The signature generator 270 generates a signature from the output frame. This generated image signature is then forwarded to the on-device RAM 255 for storing along with the use-case input frame during the duration of the FTTI. In some embodiments, the image downsampling module 240 downsamples a resolution of the use-case input frame before this frame is processed by the hardware accelerator modules 114. In these embodiments, the on-device RAM 255 may be instructed to store a downsampled version of the use-case input frame.

Once a signature of the use-case input frame 140 is generated and stored in the on-device RAM along with the use-case input frame, the I/O interfaces 215 may forward a second pre-defined input frame to the hardware accelerator modules 114 via the high-speed interconnect 245. The second pre-defined input frame may be handled in a process that mirrors the handling of the first pre-defined input frame.

Upon generating a second "pass", the image downsampling module 240 downsamples a resolution of the use-case input frame stored in the on-device RAM 255 and creates a downsampled use-case input frame. Before the end of the FTTI, the controller 112 instructs the DRAM 205 to store the downsampled use-case input frame and the generated image signature of the use-case input frame to become a new pre-defined input frame and a corresponding reference image signature, respectively. If the on-device RAM 255 is storing a downsampled version of the use-case input frame before the second "pass", then the image downsampling module 240 is not required to perform additional downsampling before the new pre-defined input frame and the corresponding reference image signature are stored in the DRAM 205.

Figure 3:
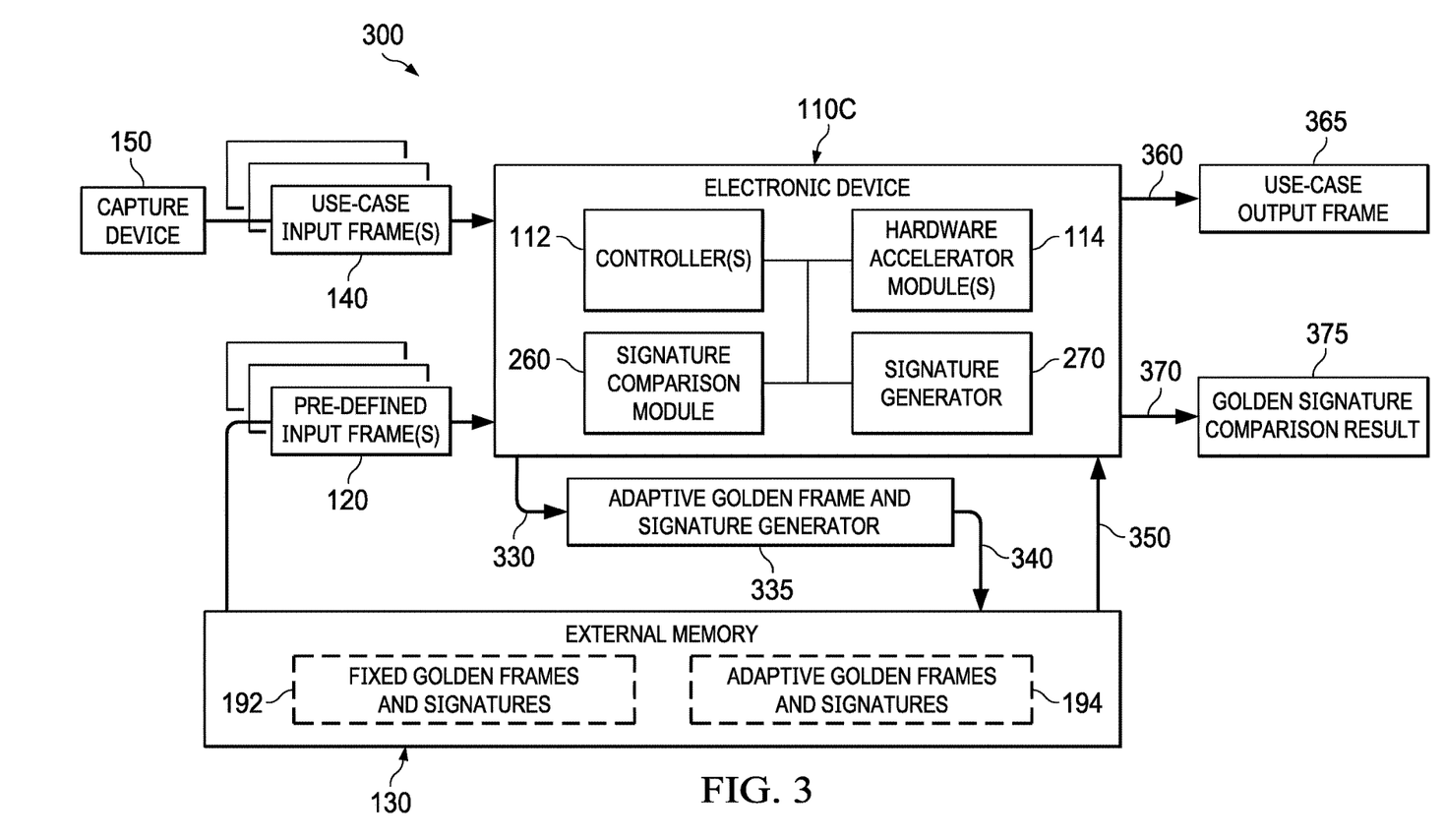
FIG. 3 is a block diagram illustrating a fault detection system including a third electronic device, in accordance with one or more embodiments.

FIG. 3 is a block diagram of a fault detection system 300 in accordance with one or more embodiments. The fault detection system 300 may include an electronic device 110C that may perform one or more functions described in reference to the electronic devices 110A and 110B of FIG. 1 or 2, respectively. Further, the electronic device 110C may perform a combination of the functionality described in reference to the electronic devices 110A and 110B.

In some embodiments, the electronic device 110C may include the controller 112, the hardware accelerator module 114, the signature comparison module 260, and the signature generator 270 described in reference to FIGS. 1 and 2. The electronic device 110C may additionally include a an adaptive golden frame and signature generator that is an extension of the controller 112 that determines whether a use-case input frame and signature meet the criteria to become a new golden frame and signature (e.g., a new pre-defined input frame and the corresponding reference image signature).

In the example of FIG. 3, the signature comparison module 260 may be hardware further configured to (upon execution of software) perform the functionality of the image downsampling module 240 and the signature processing module 265 described in reference to FIG. 2. In this example, the signature comparison module 260 may downsample the input frames to speed up the processing of the use-case input frame 140 and the pre-defined input frames 120.

In FIG. 3, during the self-tests, signatures from output frames of the downsampled input frames are compared with signatures from output frames of fixed golden signatures of fixed golden frames stored in the fixed golden frames and signatures 192. In one or more embodiments, the signature comparison module 260 runs various comparisons within the duration of the FTTI. Each comparison may determine whether a use-case input frame 140 selected is a new golden frame.

During the self-tests, the controller 112 is configured to identify output frames from the hardware accelerator module 114 corresponding to one of the pre-defined input frames 120 or one of the use-case input frames 140. The controller 112 may cause the output frames identified to be processed by the signature generator 270 to generate signatures corresponding to the output frames. Then, the signatures are forwarded to the signature comparison module 260 to perform the comparisons. If the generated image signature was generated based on an output frame after processing one of the pre-defined input frames 120, the signature comparison module 260 obtains a corresponding fixed golden signature from the fixed golden frames and signatures 192 to perform the comparison and obtains a comparison result.

In some embodiments, the comparison results indicate whether the signatures match. The comparison results are transmitted to the controller 112. If the controller 112 identifies that multiple comparisons are successful in a predetermined period of time, the controller may nominate a use-case input frame between two successfully-tested fixed golden frames to become a new pre-defined input frame. At this stage, the controller 112 transfers (through transmission 330) the generated image signature of the output frame from the nominated use-case input frame to an adaptive golden frame and signature generator 335. The adaptive golden frame and signature generator 335 may evaluate whether the nominated use-case input frame was in-between two successfully-tested fixed golden frames in the frame sequence. As explained above, if the adaptive golden frame and signature generator 335 may be an extension of the controller 112 that determines whether the nominated use-case input frame was in-between two successfully-tested fixed golden frames in a frame sequence, the nominated use-case input frame and the corresponding generated image signature are accepted as a new golden frame. The new golden frame and its generated image signature are stored into an adaptive frame pool along with the adaptive golden frames and signatures 194 through transmission 340. The adaptive frame pool 380 may be updated via the adaptive golden frame and signature generator 335 with new golden frames at least once over each FTTI.

In some embodiments, the electronic device 110C outputs a use-case specific output frame 365 and/or a golden signature comparison result 375 through transmissions 360 and 370, respectively. The use-case specific output frame 365 may be any of the output frames described in reference to FIG. 2. The golden signature comparison result 375 may be an output that is transferred outside the electronic device 110C for further testing and processing.

Figure 4:
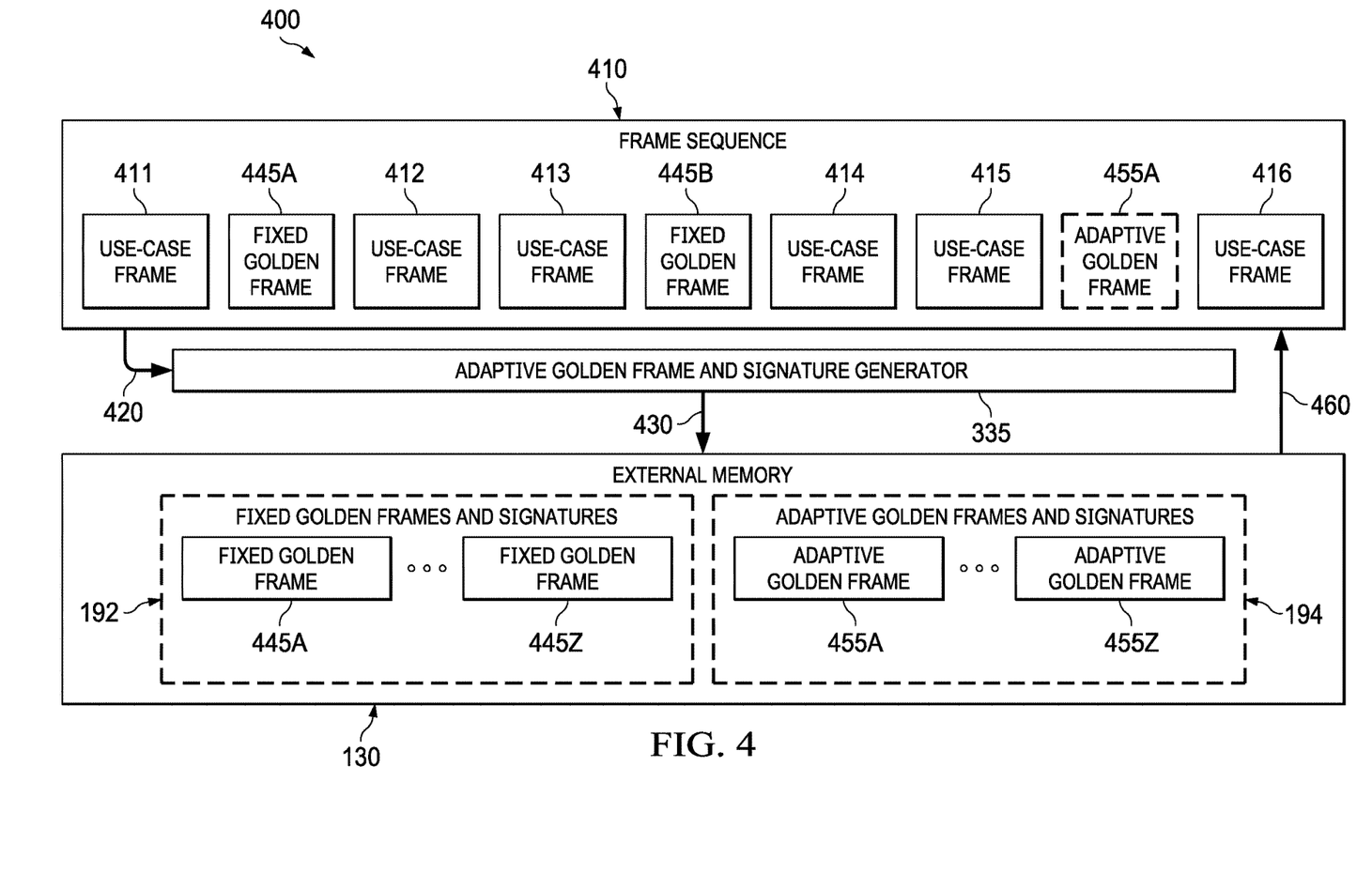
FIG. 4 is a block diagram illustrating a process of adaptively updating a fault detection system, in accordance with one or more embodiments.

FIG. 4 is a block diagram illustrating a process 400 of adaptively updating a fault detection system in accordance with one or more embodiments. The process 400 may be implemented by any one electronic device 110A-110C (collectively electronic device 110) as respectively described in reference to FIGS. 1-3.

In some embodiments, the process 400 is part of the self-tests described in reference to FIGS. 1-3. The process may use fixed golden frames and signatures from the fixed golden frame pool including the fixed golden frames and signatures 192 as a starting point. The fixed golden frame pool includes frames that have been established to produce a specific output. As described above, the fixed golden frame pool includes golden input frames for which a signature has been computed by systems external to the motor vehicle, and stored in the motor vehicle's memory. These golden input frames and signatures may have been determined to meet a predetermined level of functional safety.

In the example of FIG. 4, a frame sequence 410 is a sequence of frames processed during an FTTI. The frame sequence 410 includes multiple use-case input frames such as use-case input frames 411, 412, 413, 414, 415, and 416. Further, the frame sequence 410 may include multiple fixed golden frames 445A and 445B embedded in the stream of the frame sequence 410. The fixed golden frames 445A and 445B may be lower in resolution when compared to the frames in the use-case inputs and that allows the frames to be processed at an ultra-fast rate. The fixed golden frames from the fixed golden frame pool may be seeded continuously in the frame sequence 410. In the external memory 130, the fixed golden frame pool and the adaptive golden frame pool may be configured to contain the fixed golden frames and signatures 192 and the adaptive golden frames and signatures 194, respectively.

In FIG. 4, a first fixed golden frame 445A is identified as a golden frame in the manner described in previous FIGS. 1-3. After the first fixed golden frame 445A is identified and successfully tested, a use-case input frame is selected before a subsequent fixed golden frame (e.g., second fixed golden frame 445B) to perform a self-test. In this case, use-case input frame 413 is selected (or use-case input frame 412 could have been selected) after an output frame and a corresponding generated image signature are stored in a dynamic memory.

At this point, a second fixed golden frame 445B is identified as a golden frame in the manner described in previous FIGS. 1-3. After the second fixed golden frame 445B is identified and successfully tested, the use-case input frame 413 is evaluated to identify if the use-case input frame 413 can be designated as a new golden frame by the adaptive golden frame and signature generator 335. As described above, a designated new golden frame is a use-case input frame that is located in the frame sequence 410 between two successfully-tested fixed golden frames. At this point, the adaptive golden frame and signature generator 335 may identify a position in time on the sequence frame 410 for the first fixed golden frame 445A, the use-case input frame 413, and the second fixed golden frame 445B. If the adaptive golden frame and signature generator 335 determines that a position in time of the use-case input frame 413 is between positions in time of the first fixed golden frame 445A and the second fixed golden frame 445B, transfers the identified frame to the adaptive golden frame pool along with the adaptive golden frames and signatures 194. The memory holding the adaptive golden frames and signatures 194 acts as a golden frame pool that changes dynamically as newer adaptive golden frames and signatures are added. Once a new adaptive golden frame is identified, this frame may be used in subsequent iterations of the frame sequence 410 for self-tests.

The use-case input frame 413 is transferred to the adaptive golden frame and signature generator 335 in transmission 420. Once this frame is identified as the new golden frame, the adaptive golden frame and signature generator 335 forwards this frame in transmission 430 to join the adaptive golden frames and signatures 194. In a new iteration of the frame sequence 410, the new adaptive golden frame 455A may be used (by adding this frame in transmission 460) to be part of subsequent self-tests. In some embodiments, the new adaptive golden frame 455A is processed to generate an output frame and a signature of the output frame is compared to the stored adaptive frame signature corresponding to the new adaptive golden frame 455A.

Figure 5A:
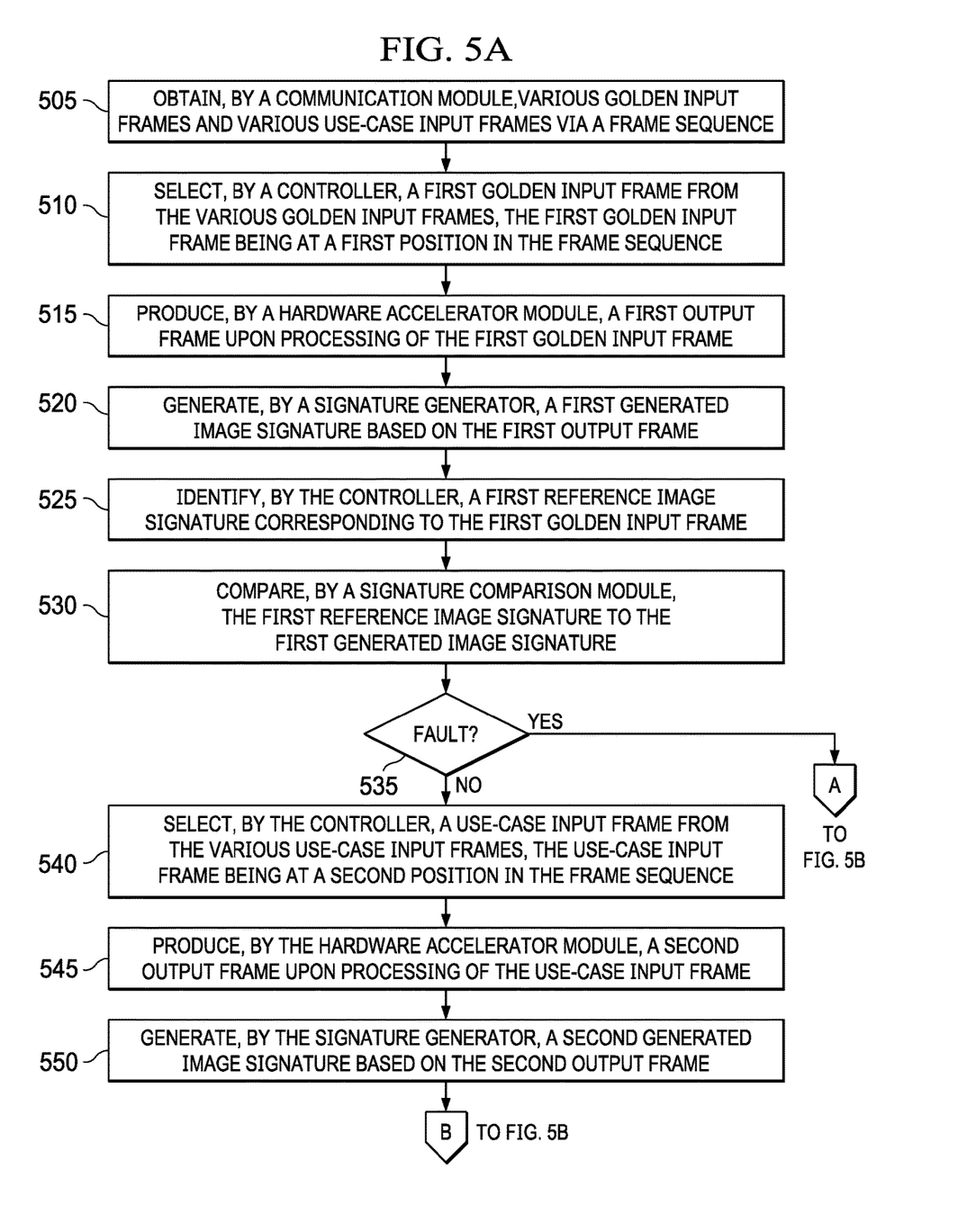
FIGS. 5A and 5B are two parts of a flowchart illustrating a process for detecting faults, in accordance with one or more embodiments.
Figure 5B:
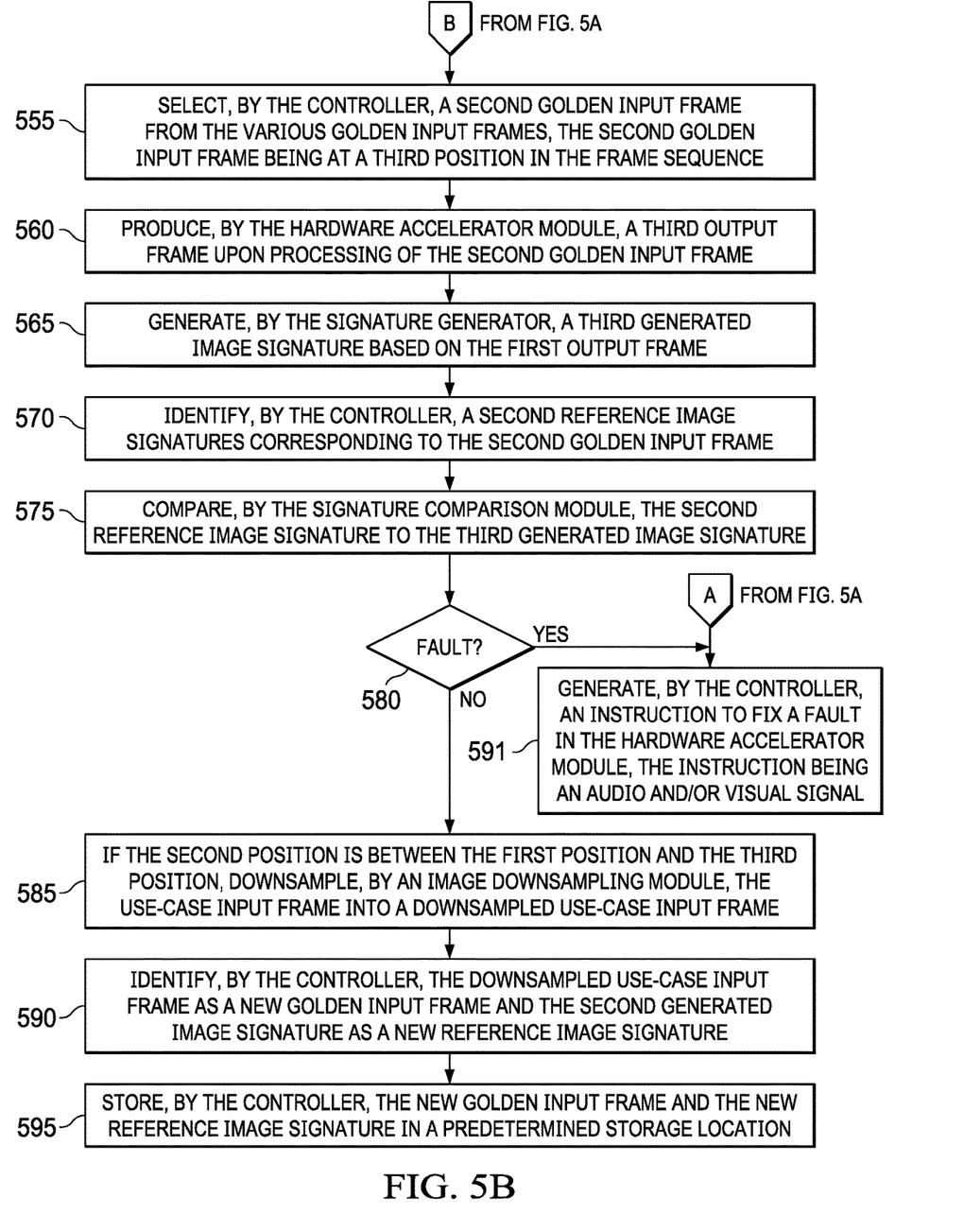

FIGS. 5A and 5B are two parts of a flowchart that illustrates a method for processing the use-case input frames 140 in accordance with one or more embodiments. Specifically, FIGS. 5A and 5B show a method for performing golden frame safety tests (e.g., the aforementioned self-test) using the use-case input frames 140. The method may be implemented using any one of the electronic devices 110A-110C described in reference to FIGS. 1-3. While the various blocks in FIGS. 5A and 5B are presented sequentially and in a particular order, the order can be varied and two or more of the blocks may be executed in parallel.

At 505, the electronic device 110 starts the fault detection method in FIG. 5A where various golden input frames and various use-case input frames are obtained via a frame sequence. This step may be performed by, for example, the communication module of FIGS. 1 and 2, or the controller 112 of FIG. 3. All of these frames may be obtained by the electronic device in a single frame sequence. Some or all of the following steps may be performed while the frame sequence is being received, and therefore any of steps 510-595 may be performed concurrent with step 505.

At 510, a first golden input frame is selected from the various golden input frames. The first golden input frame may be at a first position in time in the frame sequence. This step may be performed by, for example, the controller 112 of FIGS. 1-3. The controller 112 may select the first golden input frame immediately (e.g., automatically) upon identifying that the first golden input frame is included in the frame sequence.

At 515, a first output frame is produced upon processing of the first golden input frame. This step may be performed by, for example, the hardware accelerator modules 114 of FIGS. 1-3. As explained above, one or more of the hardware accelerator modules 114 process the first golden input frame in accordance with a motor vehicle-specific application (e.g., processing the input frames for self-driving applications, and the like).

At 520, a first generated image signature is generated based on the first output frame. This step may be performed by, for example, the controller 112 of FIG. 1, or the signature generator 270 of FIGS. 2 and 3. The signature is generated immediately after the first output frame is identified.

At 525, a first reference image signature corresponding to the first golden input frame is identified in an external memory. This step may be performed by, for example, the controller 112 of FIGS. 1-3. The external memory is searched for signatures with an identifier designating the first reference signature as the signature associated with the first golden input frame. The identifier may be a description value (e.g., a bit) in the signature that matches a description value in the first golden input frame.

At 530, the first reference image signature is compared to the first generated image signature. This step may be performed by, for example, the golden frame and signature generator 180 of FIG. 1, or the signature comparison module 260 of FIGS. 2 and 3. At 530, the comparison is made to determine whether the signatures are identical to one another.

At 535, the electronic device 110 uses the controller 112 to determine whether the hardware accelerator modules 114 have any faults. The controller may determine that the hardware accelerator modules include faults if the comparison result from 530 shows that the signatures were not identical to one another. If the controller 112 determines that the hardware accelerator modules 114 have a fault, then the method continues to 591 in FIG. 5B. If the controller 112 determines that the hardware accelerator modules 114 does not have a fault, then the method continues to 540.

At 591, the controller 112 generates an instruction to fix a fault in one or more of the hardware accelerator modules 114. The instruction may be an audio and/or visual signal. As described above, in the case of permanent faults, the instruction to fix a fault may be providing a visual indication on a display within the vehicle that a problem has occurred with a component of the vehicle and that servicing is required. In some embodiments, the instruction may be an error in the vehicle and subsequently recoverable by a service technician that indicates that the permanent fault is located in the one of the hardware accelerator modules 114.

At 540, when no fault is detected at step 535, a use-case input frame is selected from the various use-case input frames in the frame sequence. The use-case input frame may be at a second position in time in the frame sequence. This step may be performed by, for example, the controller 112 of FIGS. 1-3. The controller 112 may select the first golden input frame immediately (e.g., automatically) upon identifying that the first golden input frame is included in the frame sequence.

At 545, a second output frame is produced upon processing of the use-case input frame. This step may be performed by, for example, the hardware accelerator modules 114 of FIGS. 1-3. As explained above, one or more of the hardware accelerator modules 114 process the second golden input frame in accordance with the motor vehicle-specific application (e.g., processing the input frames for self-driving applications, and the like). The motor vehicle-specific application may be the same (or different) application used for the first golden input frame.

At 550, a second generated image signature is generated based on the second output frame. This step may be performed by, for example, the controller 112 of FIG. 1, or the signature generator 270 of FIGS. 2 and 3. The signature is generated immediately after the first output frame is identified.

In FIG. 5B, the flowchart continues at 555, a second golden input frame is selected from the various golden input frames in the frame sequence. The second golden input frame may be at a third position in time in the frame sequence. This step may be performed by, for example, the controller 112 of FIGS. 1-3. The controller 112 may select the first golden input frame immediately (e.g., automatically) upon identifying that the first golden input frame is included in the frame sequence.

At 560, a third output frame is produced upon processing of the second golden input frame. This step may be performed by, for example, the hardware accelerator modules 114 of FIGS. 1-3.

At 565, a third generated image signature is generated based on the third output frame. This step may be performed by, for example, the controller 112 of FIG. 1, or the signature generator 270 of FIGS. 2 and 3. The signature is generated immediately after the first output frame is identified.

At 570, a second reference image signature corresponding to the second golden input frame is identified in an external memory. This step may be performed by, for example, the controller 112 of FIGS. 1-3. The external memory is searched for signatures with an identifier designating the second reference signature as the signature associated with the second golden input frame.

At 575, the second reference image signature is compared to the third generated image signature. This step may be performed by, for example, the golden frame and signature generator 180 of FIG. 1, or the signature comparison module 260 of FIGS. 2 and 3. At 575, the comparison is made to determine whether the signatures are identical to one another.

At 580, the electronic device 110 uses the controller 112 to determine whether the hardware accelerator modules 114 have any faults. The controller may determine that the hardware accelerator modules include faults if the comparison result from 575 shows that the signatures were not identical to one another. If the controller 112 determines that the hardware accelerator modules 114 have a fault, then the method continues to 591. If the controller 112 determines that the hardware accelerator modules 114 does not have a fault, then the method continues to 585.

At 585, if the second position in time is between the first position in time and the third position in time, the use-case input frame associated with the second position is downsampled into a downsampled use-case input frame. This step may be performed by, for example, the controller 112 of FIGS. 1 and 3, or the image downsampling module 240 of FIG. 2. A determination that the second position in time is between the first position in time and the third position in time may be performed by, for example, the golden frame and signature generator 180 of FIG. 1, or the controller 112 of FIG. 2, or the adaptive golden frame and signature generator 335 of FIG. 3.

At 590, the downsampled use-case input frame and the second generated image signature are identified as a new golden input frame and a new reference image signature, respectively. This step may be performed by, for example, the golden frame and signature generator 180 of FIG. 1, or the image downsampling module 240 of FIG. 2, or the controller 112 of FIG. 3. The use-case input frame may not be downsampled if a downsampled version of the use-case input frame is already ready to be stored (e.g., the use-case input frame was downsampled before it was processed by the hardware accelerator modules 114).

The flowchart ends in FIG. 5B at 595, where the new golden input frame and the new reference image signature are stored in a predetermined storage location in the external memory. This step may be performed by, for example, the controller 112 of FIGS. 1 and 2, or the adaptive golden frame and signature generator of FIG. 3. The predetermined storage location may be a golden frame and signature pool such as the adaptive golden frames and signatures 194 described in reference to FIGS. 1-4.

In the description, certain specific details are set forth in order to provide a thorough understanding of various disclosed implementations and embodiments. However, one skilled in the relevant art will recognize that implementations and embodiments may be practiced without one or more of these specific details, or with other methods, components, or materials.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. An electronic device, comprising:
a controller configured to:
select, from a frame sequence, first and second reference input frames of a plurality of reference input frames and a use-case input frame, and
retrieve first and second reference image signatures corresponding to the first and second reference input frames, respectively;
a hardware accelerator configured to:
generate a first output frame based on the first reference input frame,
generate a second output frame based on the second reference input frame, and
generate a third output frame based on the use-case input frame;
a signature generator configured to generate a first generated image signature based on the first output frame, generate a second generated image signature based on the second output frame, and generate a third generated image signature based on the third output frame; and
a signature comparator configured to:
compare the first generated image signature to the first reference image signature, and compare the second generated image signature to the second reference image signature;
wherein, when the controller determines, based on the comparison of the first generated image signature to the first reference image signature and the comparison of the second generated image signature to the second reference image signature, that the hardware accelerator does not have a fault at either a first time or a second time, the controller is further configured to identify the use-case input frame as a potential new reference input frame and the third generated image signature as a potential new reference image signature.

2. The electronic device of claim 1, wherein, when the controller determines that the hardware accelerator does not have a fault at either the first or the second time:
the controller is further configured to:
determine whether the use-case input frame is between the first reference input frame and the second reference input frame in the frame sequence.

3. The electronic device of claim 2, wherein, when the controller determines that the use-case input frame is between the first reference input frame and the second reference input frame in the frame sequence:
an image downsampler is configured to downsample the use-case input frame into a downsampled use-case input frame, and
the controller is further configured to:
identify the downsampled use-case input frame as a new reference input frame and the third generated image signature as a new reference image signature, and
store the new reference input frame and the new reference image signature in a storage.

4. The electronic device of claim 1, wherein a time duration of the frame sequence is a Fault Tolerant Time Interval (FTTI) between 50 milliseconds and 250 milliseconds.

5. A system, comprising:
a capture device configured to obtain a plurality of use-case input frames from an environment and introduce the plurality of use-case input frames into a frame sequence;

an external memory configured to store a plurality of reference input frames, which are introduced into the frame sequence; and an electronic device comprising:
  a controller configured to:
    select first and second reference input frames of the plurality of golden input frames and a use-case input frame of the plurality of use-case input frames, and
    retrieve first and second reference image signatures corresponding to the first and second reference input frames, respectively,
  a hardware accelerator configured to:
    generate a first output frame based on the first reference input frame,
    generate a second output frame based on the second reference input frame, and
    generate a third output frame based on the use-case input frame;
  a signature generator configured to generate a first generated image signature based on the first output frame, and
  a signature comparison configured to:
    compare the first generated image signature to the first reference image signature, and compare the second generated image signature to the second reference image signature,
  wherein, when the controller determines, based on the comparison of the first generated image signature to the first reference image signature and the comparison of the second generated image signature to the second reference image signature, that the hardware accelerator does not have a fault at either a first time or a second time, the controller is further configured to identify the use-case input frame as a potential new reference input frame and the third generated image signature as a potential new reference image signature.

6. The system of claim 5, wherein, when the controller determines that the hardware accelerator does not have a fault at either the first or the second time:
  the controller is further configured to:
    determine whether the use-case input frame is between the first reference input frame and the second reference input frame in the frame sequence.

7. The system of claim 6, wherein, when the controller determines that the use-case input frame is between the first reference input frame and the second reference input frame in the frame sequence:
  an image downsampler is configured to downsample the use-case input frame into a downsampled use-case input frame, and
  the controller is further configured to:
    identify the downsampled use-case input frame as a new reference input frame and the third generated image signature as a new reference image signature, and
    store the new reference input frame and the new reference image signature in a storage.

8. A method, comprising:
  selecting from a frame sequence, by a controller, first and second reference input frames of a plurality of reference input frames and a use-case input frame, the first reference input frame being at a first position in time in a frame sequence and the second reference input frame being at a second position in time in the frame sequence;
  producing, by a hardware accelerator, first and second output frames upon processing of the first and second reference input frames, respectively, and producing a third output frame upon processing the use-case input frame;
  generating, by a signature generator, a first generated image signature based on the first output frame, second generated image signature based on the second output frame, and a third generated image signature based on the third output frame;
  comparing, by a signature comparison, the first reference image signature to the first generated image signature, and comparing the second reference image signature to the second generated image signature;
  wherein, when the controller determines, based on the comparison of the first generated image signature to the first reference image signature and the comparison of the second generated image signature to the second reference image signature, that the hardware accelerator does not include a fault at either the first or the second time, the controller is further configured to identify the use-case input frame as a potential new reference input frame and the third generated image signature as a potential new reference image signature.

9. The method of claim 8, further comprising:
  determining, by the controller, the use-case input frame is at a third position in time in the frame sequence, the third position being between the first and second positions;
  downsampling, by an image downsampler, the use-case input frame into a downsampled use-case input frame;
  identifying, by the controller, the downsampled use-case input frame as a new reference input frame and the second generated image signature as a new reference image signature; and
  storing, by the controller, the new reference input frame and the new reference image signature in a storage.

10. The system of claim 5, wherein a time duration of the frame sequence is a Fault Tolerant Time Interval (FTTI) between 50 milliseconds and 250 milliseconds.

11. The method of claim 8, wherein a time duration of the frame sequence is a Fault Tolerant Time Interval (FTTI) between 50 milliseconds and 250 milliseconds.

* * * * *